Feb. 8, 1938.            C. E. FISETTE            2,107,565
HYDRAULIC MASTER BRAKE CYLINDER CONTROL
Filed Oct. 28, 1936
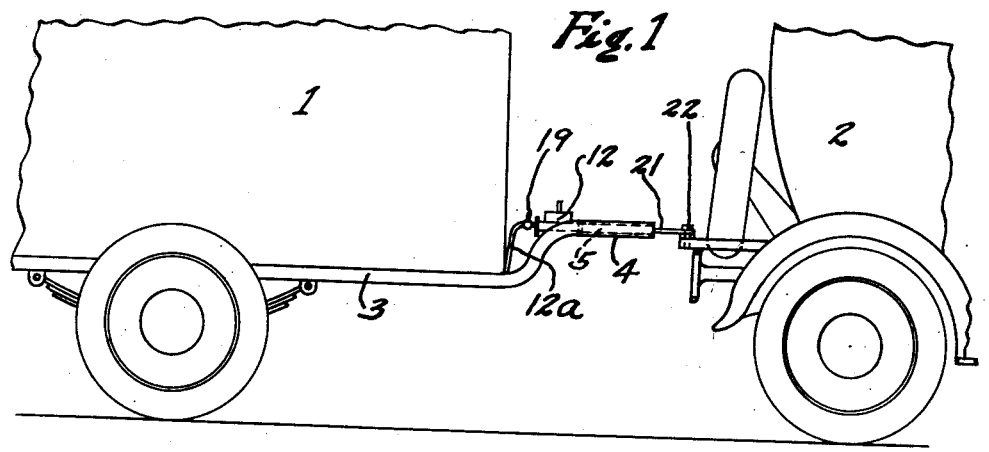
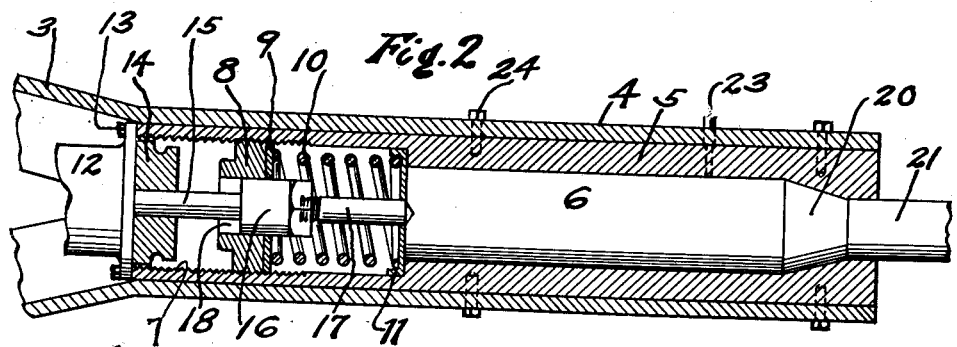
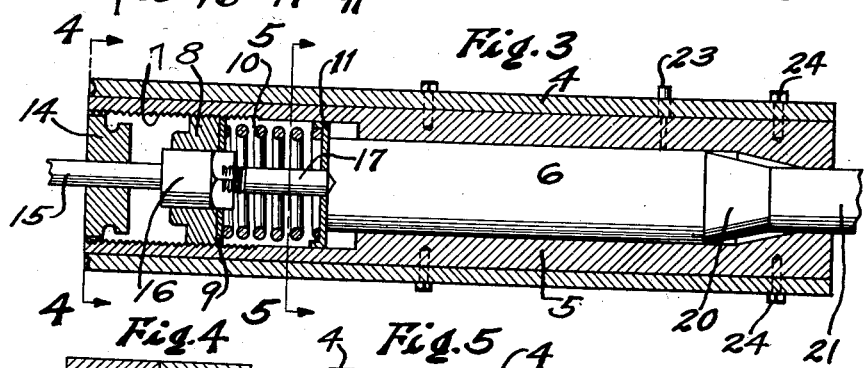
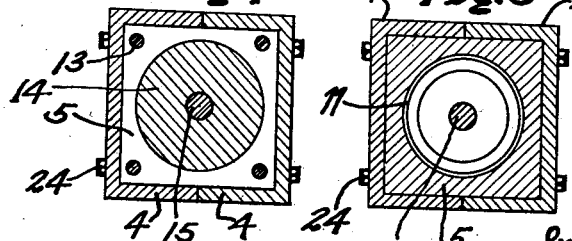
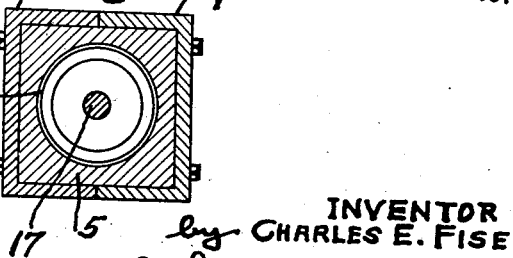
INVENTOR
by CHARLES E. FISETTE
John A. McDowell
his atty.

Patented Feb. 8, 1938

2,107,565

UNITED STATES PATENT OFFICE 2,107,565

HYDRAULIC MASTER BRAKE CYLINDER CONTROL

Charles E. Fisette, Los Angeles, Calif.

Application October 28, 1936, Serial No. 108,031

2 Claims. (Cl. 188—142)

An object of this invention is to provide a brake cylinder control placed between the rear end of an automobile and a trailer to so regulate the brakes on the trailer without any strain whatsoever upon the brakes of the automobile.

Another object is to provide a device which shall be of simple construction and therefore of inexpensive manufacture, and yet which will prove thoroughly practical and efficient in use.

Another object of the invention is that the device is so constructed and arranged to operate brakes of a trailing vehicle, giving the proper amount of pressure at the required time and will operate as the automobile slows up or stops.

This invention may have a variety of applications and certain of the features of construction may be embodied in a variety of structures.

Other objects, advantages and features of invention may appear from the accompanying drawing, the subjoined detailed description and the appended claims.

The accompanying drawing illustrates the invention.

Figure 1 is a fragmental side elevation of a trailer and automobile showing how the invention is applied to the trailer frame tongue and shows diagrammatically the method of connecting the invention to the master brake cylinder which is also shown.

Fig. 2 is an enlarged fragmental horizontal section through the trailer tongue showing the invention partly in section with a fragment of the master cylinder fixed thereto and method of fixing the master plunger body to the trailer tongue.

Fig. 3 is a view analogous to Fig. 2 showing the master plunger in a retarded position and omitting fragments of the master cylinder and trailer tongue.

Fig. 4 is a section on the line 4—4 of Figure 3.

Fig. 5 is a section on the line 5—5 of Figure 3.

The reference numeral 1 designates the front end of a trailer 1 and 2 the rear end of an automobile and only such portion thereof illustrated as required to locate the device of my invention. The frame 3 and trailer tongue 4 of the trailer 1 are, or may be of any approved construction.

The master plunger body 5 is so constructed and arranged to fit snugly in the tongue 4 and houses the master plunger 6 which is slidably mounted therein.

The master plunger body 5 is provided at one end with an internally threaded bore 7 that permits the spring adjusting nut 8 to be threaded therein to permit adjustment of the tension of the movement of master plunger 6 and to govern the necessary stroke of the plunger in the master cylinder 12 for the best adjustment of different weight trailers.

A friction washer 9 rests against the adjusting nut 8 and is held in place by a tension spring 10 that is guided by a spring cup 11 that fits snugly at the bottom of the bore 7.

A master cylinder 12 is shown held in position by bolts 13 to the master plunger body 5 and is provided with a unit 14 that extends into the internally threaded bore 7 to provide a bearing guide for the master cylinder connecting rod 15 that is provided with an adjusting nut 16 for the connecting pin 17 that contacts the end of the master plunger 6 so that whenever the master plunger 6 is moved forward or backward it operates the master cylinder 12 to apply or release the brakes not shown of the trailer 1 through the fluid line 12a.

The spring adjusting nut 8 is provided with a bore 18 that forms a guide for the adjusting nut 16.

The connecting pin 17 is threaded as at 17a into the adjusting nut 16 to compensate for wear for the life of the device.

A shut off valve 19 is provided in the fluid line 12a at the back of the master cylinder 12 to nullify the brake action on the trailer 1 if so desired.

The plunger 6 is provided with a tapered shoulder 20 that abuts against the master plunger body 5 as shown in Figs. 2 and 3 of the drawing and a reduced portion 21 forms a link to connect the plunger to the automobile 2 as shown at the connection 22 in Fig. 1 of the drawing.

To permit a smooth sliding fit at all times of the plunger 6 in the master cylinder plunger body 5 a grease tap 23 is provided.

Bolts 24 are provided to hold the master plunger body 5 fixed to the trailer tongue 4.

In operation when the automobile 2 retards its speed or stops trailer 1 advances on master plunger 6 operating connecting pin 17 and cylinder rod 15 causing the master cylinder 12 to operate.

I claim:

1. A device of the character set forth adapted to be placed between a towing vehicle and a trailer comprising a plunger body; a plunger slidably mounted in said plunger body adapted to apply brakes on the trailer; an internally threaded bore provided at one end of said plunger body; a spring adjusting nut mounted in said threaded bore; a friction washer resting against said adjusting nut; a spring cup slidably mounted at the bottom of said internally threaded bore to act as a guide for a tension spring which is interposed between said friction washer and said spring cup that absorbs any shock through the plunger; means slidably mounted in said internally threaded bore connecting said plunger so that when said plunger is actuated it causes the brakes of the trailer to operate.

2. A device of the character set forth adapted to be placed between a towing vehicle and a trailer comprising a plunger body; a plunger slidably mounted in said plunger body adapted to apply brakes on the trailer; said plunger being provided at one end with a tapered shoulder that abuts against said plunger body; an internally threaded bore provided at one end of said plunger body; a grease tap in said plunger body that provides means of a smooth sliding fit at all times of said plunger and means slidably mounted in said internally threaded bore connecting said plunger so that when said plunger is actuated it causes the brakes of the trailer to operate.

CHARLES E. FISETTE.